United States Patent
Cavalieri et al.

(10) Patent No.: US 12,024,623 B2
(45) Date of Patent: Jul. 2, 2024

(54) COMPOSITIONS OBTAINED FROM RECYCLED POLYOLEFINS

(71) Applicant: BASELL POLIOLEFINE ITALIA S.R.L., Milan (IT)

(72) Inventors: Claudio Cavalieri, Ferrara (IT); Monica Galvan, Ferrara (IT); Marco Ciarafoni, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 516 days.

(21) Appl. No.: 17/438,740

(22) PCT Filed: Feb. 20, 2020

(86) PCT No.: PCT/EP2020/054420
§ 371 (c)(1),
(2) Date: Sep. 13, 2021

(87) PCT Pub. No.: WO2020/182435
PCT Pub. Date: Sep. 17, 2020

(65) Prior Publication Data
US 2022/0145057 A1  May 12, 2022

(30) Foreign Application Priority Data

Mar. 12, 2019 (EP) .................................. 19162074

(51) Int. Cl.
| | |
|---|---|
| *C08L 23/16* | (2006.01) |
| *C08L 23/08* | (2006.01) |
| *C08L 23/12* | (2006.01) |
| *C08L 23/04* | (2006.01) |

(52) U.S. Cl.
CPC .......... *C08L 23/16* (2013.01); *C08L 23/0815* (2013.01); *C08L 23/12* (2013.01); *C08L 23/04* (2013.01); *C08L 2205/025* (2013.01); *C08L 2205/035* (2013.01); *C08L 2207/20* (2013.01)

(58) Field of Classification Search
CPC .......... C08L 23/16; C08L 23/04; C08L 23/12; C08L 2207/20; C08L 2205/02; C08L 2205/035
See application file for complete search history.

(56) References Cited

U.S. PATENT DOCUMENTS

| | | | |
|---|---|---|---|
| 11,174,379 B2 * | 11/2021 | De Palo | ............. C08L 23/0815 |
| 11,708,484 B2 * | 7/2023 | De Palo | ................. C08L 23/16 |
| | | | 525/240 |
| 2022/0153975 A1 * | 5/2022 | Cavalieri | ............... C08L 23/12 |

FOREIGN PATENT DOCUMENTS

| | | | | |
|---|---|---|---|---|
| CN | 102869720 A | 1/2013 | | |
| EP | 2062937 A1 | 5/2009 | | |
| EP | 3165473 A1 | 5/2017 | | |
| WO | 2007071494 A1 | 6/2007 | | |
| WO | 2011160953 A1 | 12/2011 | | |
| WO | 2015169690 A1 | 11/2015 | | |
| WO | 2019091885 A1 | 5/2019 | | |
| WO | WO-2020182436 A1 * | 9/2020 | ............. | C08L 23/12 |

OTHER PUBLICATIONS

Internataional Search Report and Written Opinion Mailed May 25, 2020 (May 25, 2020) for Corresponding PCT/EP2020/054420.

* cited by examiner

*Primary Examiner* — Rip A Lee

(57) ABSTRACT

A polyolefin composition made from or containing:
T1) 50-90 wt % of a recycled polyolefin mixture; and
T2) 10-50 wt % of a polyolefin component containing:
A) 5-35% by weight of a propylene homopolymer or a propylene ethylene copolymer;
B) 20-50% by weight of a copolymer of ethylene and a $C_3$-$C_8$ alpha-olefin made from or containing 0.1-20% by weight of alpha-olefin units; and
C) 30-60% by weight of a copolymer of ethylene and propylene made from or containing 25-75% by weight of ethylene units.

14 Claims, No Drawings

COMPOSITIONS OBTAINED FROM RECYCLED POLYOLEFINS

This application is the U.S. National Phase of PCT International Application PCT/EP2020/054420, filed Feb. 20, 2020, claiming benefit of priority to European Patent Application No. 19162074.9, filed Mar. 12, 2019, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to compositions obtained from recycled polyolefins mixtures.

BACKGROUND OF THE INVENTION

Polyolefins are consumed for applications including packaging for food and other goods, fibers, automotive components, and manufactured articles. The quantity of polyolefins raises concerns for the environmental impact of the waste materials generated after the first use of the polyolefins.

Waste plastic materials are coming from differential recovery of municipal plastic wastes. In some instances, municipal plastic waste includes flexible packaging (cast film, blown film and BOPP film), rigid packaging, blow-molded bottles and injection-molded containers. Through a step of separation from other polymers, polyolefin fractions are obtained. The polyolefin fractions include polyethylene and polypropylene polymers. In some instances, the polyethylene polymers are HDPE, LDPE, or LLDPE. In some instances, the polypropylene polymers are homopolymers, random copolymers, or heterophasic copolymers.

A challenge in polyolefin recycling is separating quantitatively polypropylene (PP) and polyethylene (PE). In some instances, commercial recyclates from post-consumer waste (PCW) sources contain mixtures of PP and PE, wherein the minor component is up to <50 wt %.

In some instances, the recycled PP/PE-blends suffer from deteriorated mechanical and optical properties, poor performance in odor and taste, and poor compatibility between the polymer phases, thereby adversely affecting impact strength and heat deflection resistance. It is believed that the performance is partly caused by PE, having lower stiffness and melting point, forming the continuous phase, even when PP concentrations are up to 65%. It is further believed that PE forms the continuous phase because the PE components in PCW have higher viscosity than the PP components.

In some instances, the recycled PP/PE-blends are excluded from use in high quality parts. Alternatively, the recycled PP/PE-blends are used in low-cost and non-demanding applications.

SUMMARY OF THE INVENTION

In a general embodiment, the present disclosure provides a polyolefin composition made from or containing:
T1) 50-90 wt % of a recycled polyolefin mixture containing from 90 wt % to 50 wt % of propylene derived units and from 5 wt % to 40 wt % of ethylene derived units optionally containing up to 15 wt % of olefin derived units selected from the group consisting of 1-butene, 1-hexene, and 1-octene; wherein the mixture has:

i) a fraction soluble in xylene at 25° C. from 5 wt % to 30 wt %;
ii) an intrinsic viscosity [η] (measured in tetrahydronaphthalene at 135° C.) of the xylene soluble fraction at 25° C. between 0.5 to 4.0 dl/g;
iii) a melt flow rate (230° C./2.16 kg) between 1 to 50 g/10 min; and
iv) a melting point measured by DSC from 148° C. to 162° C.; and
T2) 10-50 wt % of a polyolefin component containing:
A) 5-35% by weight of a propylene homopolymer or a propylene ethylene copolymer containing 90% by weight or more of propylene units; component A) containing 10% by weight or less of a fraction soluble in xylene at 25° C. (XSA), both the amount of propylene units and the fraction XSA being referred to the weight of A);
B) 20-50% by weight of a copolymer of ethylene and a C3-C8 alpha-olefin containing from 0.1% to 20% by weight of alpha-olefin units and containing 25% by weight or less of a fraction soluble in xylene at 25° C. (XSB), both the amount of alpha-olefin units and the fraction XSB being referred to the weight of (B); and
C) 30-60% by weight of a copolymer of ethylene and propylene containing from 25% to 75% by weight of ethylene units and containing from 40% to 95% by weight of a fraction soluble in xylene at 25° C. (XSC), both the amount of ethylene units and the fraction XSC being referred to the weight of (C);
the sum of the amounts of (A), (B) and (C) being referred to the total weight of (A), (B) and (C), being 100;
the sum of the amount of T1) and T2), being referred to the total weight of T1) and T2), being 100.

DETAILED DESCRIPTION OF THE INVENTION

In some embodiments, the present disclosure provides a polyolefin composition made from or containing:
T1) 50-90 wt %, alternatively 60-80 wt %; alternatively from 65 wt % to 75 wt %, of a recycled polyolefin mixture containing from 90 wt % to 50 wt % of propylene derived units and from 5 wt % to 40 wt % of ethylene derived units optionally containing up to 15 wt % of olefin derived units selected from the group consisting of 1-butene, 1-hexene, and 1-octene; wherein the mixture has:
i) a fraction soluble in xylene at 25° C. from 5 wt % to 30 wt %; alternatively from 6 wt % to 15 wt %;
ii) an intrinsic viscosity [η] (measured in tetrahydronaphthalene at 135° C.) of the xylene soluble fraction at 25° C. between 0.5 to 4.0 dl/g, alternatively between 0.8 to 3.0 dl/g; alternatively between 1.0 to 2.5 dl/g;
iii) a melt flow rate (230° C./2.16 kg) between 1 to 50 g/10 min; alternatively between 4 to 30 g/10 min; alternatively between 6 to 20 g/10 min; and
iv) a melting point measured by DSC from 148° C. to 162° C.; alternatively from 150° C. to 160° C.; alternatively from 155° C. to 159° C.;
T2) 50-10 wt %, alternatively 40-20 wt %; alternatively from 35 wt % to 25 wt %, of a polyolefin component containing:
A) 5-35% by weight; alternatively 10-30% by weight; alternatively 15-25% by weight, of a propylene homopolymer or a propylene ethylene copolymer containing 90% by weight or more, alternatively 95% by weight or more; alternatively 97% by weight or more, of propylene units; component A) containing 10% by weight or less, alternatively 8 wt % or less, alternatively 6 wt % or less, of a fraction soluble in xylene at 25° C. (XSA), both the amount of propylene units and the fraction XSA being referred to the weight of A);

B) 20-50% by weight; alternatively 25-45% by weight; alternatively 30-40% by weight, of a copolymer of ethylene and a $C_3$-$C_8$ alpha-olefin containing from 0.1% to 20% by weight; alternatively from 5% to 15% by weight; alternatively from 7% to 12% by weight, of alpha-olefin units and containing 25% by weight or less; alternatively from 20% by weight or less; alternatively 17% by weight or less, of a fraction soluble in xylene at 25° C. ($XS_B$), both the amount of alpha-olefin units and the fraction $XS_B$ being referred to the weight of (B); and C) 30-60% by weight; alternatively 35-55% by weight; alternatively 40-50% by weight, of a copolymer of ethylene and propylene containing from 25% to 75% by weight; alternatively from 37% to 65% by weight; alternatively from 45% to 58% by weight, of ethylene units and containing from 40% to 95% by weight of a fraction soluble in xylene at 25° C. ($XS_C$), both the amount of ethylene units and the fraction $XS_C$ being referred to the weight of (C);

the sum of the amounts of (A), (B) and (C) being referred to the total weight of (A), (B) and (C), being 100;

the sum of the amount of T1) and T2), being referred to the total weight of T1) and T2), being 100;

In some embodiments, component T1) is a mixture of recycled polypropylene and polyethylene blend. In some embodiments, component T1) has a tensile modulus from 500 MPa to 1800 MPa; alternatively from 900 MPa to 1500 MPa.

In some embodiments, component T1) has an elongation at break from 20% to 200%; alternatively from 30% to 100%.

In some embodiments, component T1) has a tensile stress at break from 9 MPa to 30 MPa, alternatively from 12 MPa to 25 MPa; alternatively from 13 MPa to 20 MPa.

In some embodiments and in component T2), component (A) has a melt flow rate (230° C./2.16 kg) between 50 to 200 g/10 min; alternatively between 80 to 170 g/10 min.

In some embodiments, components (A)+(B) blended together have a melt flow rate (230° C./2.16 kg) between 0.1 to 70 g/10 min. alternatively between 1 to 50 g/10 min; alternatively between 8 to 40 g/10 min.

In some embodiments, component B) has a density (determined according to ISO 1183 at 23° C.) of from 0.940 to 0.965 g/cm3. Component B) is an ethylene copolymer containing $C_3$-$C_8$ alpha-olefin derived units. In some embodiments, the alpha-olefin comonomers are selected from the group consisting of propylene, 1-butene, 1-pentene, 4-methyl-1-pentene, 1-hexene and 1-octene; alternatively 1-butene 1-hexene and 1-octene. In some embodiments, the alpha-olefin comonomer is 1-butene.

In some embodiments, the polyolefin composition T2) has a melt flow rate (230° C./2.16 kg) between 0.5 to 25 g/10 min, alternatively from 0.8 to 20.0 g/10 min; alternatively from 1.0 to 18.0 g/10 min.

In some embodiments, the polyolefin composition T2) has an intrinsic viscosity [η] (measured in tetrahydronaphthalene at 135° C.) of the xylene soluble fraction at 25° C. between 1.5 to 4.0 dl/g, alternatively between 2.0 to 3.5 dl/g; alternatively between 2.1 to 2.8 dl/g.

As used herein, the term "copolymer" refers to polymers containing two kinds of comonomers, such as propylene and ethylene or ethylene and 1-butene.

In some embodiments, polyolefin composition T2) is prepared by a sequential polymerization, including at least three sequential steps, wherein components (A), (B) and (C) are prepared in separate subsequent steps, operating in each step, except the first step, in the presence of the polymer formed and the catalyst used in the preceding step. In some embodiments, the catalyst is added in the first step and not in subsequent steps. In some embodiments, the catalyst remains active for the subsequent steps.

In some embodiments, the polymerization is a continuous process. In some embodiments, the polymerization is a batch process. In some embodiments, the polymerization is carried out in liquid phase, in the presence or not of inert diluent, or in gas phase, or by mixed liquid-gas techniques. In some embodiments, the polymerization is carried out in gas phase.

In some embodiments, the temperature for the polymerization steps is from 50 to 100° C. In some embodiments, the pressure is atmospheric or higher.

In some embodiments, the molecular weight is regulated. In some embodiments, the molecular weight regulator is hydrogen.

In some embodiments, the polymerizations are carried out in the presence of a Ziegler-Natta catalyst. In some embodiments, a Ziegler-Natta catalyst is made from or containing the product of the reaction of an organometallic compound of group 1, 2 or 13 of the Periodic Table of elements with a transition metal compound of groups 4 to 10 of the Periodic Table of Elements (new notation). In some embodiments, the transition metal compound is selected from the group consisting of compounds of Ti, V, Zr, Cr and Hf. In some embodiments, the transition metal compound is supported on MgCl2.

In some embodiments, the catalysts are made from or containing the product of the reaction of the organometallic compound of group 1, 2 or 13 of the Periodic Table of elements, with a solid catalyst component made from or containing a Ti compound and an electron donor compound supported on MgCl2.

In some embodiments, the organometallic compounds are aluminum alkyl compounds.

In some embodiments, the polymer composition B) is obtained by using a Ziegler-Natta polymerization catalyst, alternatively a Ziegler-Natta catalyst supported on MgCl2, alternatively a Ziegler-Natta catalyst made from or containing the product of reaction of:

1) a solid catalyst component made from or containing a Ti compound and an electron donor (internal electron-donor) supported on MgCl2;

2) an aluminum alkyl compound (cocatalyst); and, optionally, 3) an electron-donor compound (external electron-donor).

In some embodiments, the solid catalyst component (1) contains, as an electron donor, a compound selected from the group consisting of ethers, ketones, lactones, compounds containing N, P and/or S atoms, and mono- and dicarboxylic acid esters.

In some embodiments, the catalysts are as described in U.S. Pat. No. 4,399,054 and European Patent No. 45977.

In some embodiments, the electron-donor compounds are selected from the group consisting of phthalic acid esters and succinic acid esters. In some embodiments, the phthalic acid ester is diisobutyl phthalate.

In some embodiments, the succinic acid esters are represented by the formula (I):

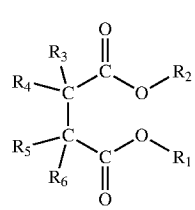

(I)

wherein the radicals $R_1$ and $R_2$, equal to or different from each other, are a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to or different from each other, are hydrogen or a $C_1$-$C_{20}$ linear or branched alkyl, alkenyl, cycloalkyl, aryl, arylalkyl or alkylaryl group, optionally containing heteroatoms. In some embodiments, the radicals $R_3$ to $R_6$ are joined to the same carbon atom and linked together to form a cycle.

In some embodiments, $R_1$ and $R_2$ are $C_1$-$C_8$ alkyl, cycloalkyl, aryl, arylalkyl and alkylaryl groups. In some embodiments, $R_1$ and $R_2$ are selected from primary alkyls, alternatively branched primary alkyls. In some embodiments, $R_1$ and $R_2$ groups are selected from the group consisting of methyl, ethyl, n-propyl, n-butyl, isobutyl, neopentyl, and 2-ethylhexyl. In some embodiments, $R_1$ and $R_2$ groups are selected from the group consisting of ethyl, isobutyl, and neopentyl.

In some embodiments, $R_3$ to $R_5$ are hydrogen and $R_6$ is a branched alkyl, cycloalkyl, aryl, arylalkyl and alkylaryl radical having from 3 to 10 carbon atoms. In some embodiments, at least two radicals from $R_3$ to $R_6$ are different from hydrogen and selected from $C_1$-$C_{20}$ linear or branched alkyl, alkenyl, cycloalkyl, aryl, arylalkyl or alkylaryl group, optionally containing heteroatoms. In some embodiments, the two radicals different from hydrogen are linked to the same carbon atom. In some embodiments, $R_3$ and $R_8$ are different from hydrogen and linked to different carbon atoms. In some embodiments, $R_4$ and $R_6$ are different from hydrogen and linked to different carbon atoms.

In some embodiments, the electron-donors are the 1,3-diethers described in European Patent Application Nos. EP-A-361 493 and 728769.

In some embodiments, cocatalysts (2) are trialkyl aluminum compounds. In some embodiments, the trialkyl aluminum compounds are selected from the group consisting of Al-triethyl, Al-triisobutyl and Al-tri-n-butyl.

In some embodiments, the electron-donor compounds (3) used as external electron-donors (added to the Al-alkyl compound) are selected from the group consisting of aromatic acid esters, heterocyclic compounds, and silicon compounds containing at least one Si—OR bond (where R is a hydrocarbon radical). In some embodiments, the aromatic acid esters are alkylic benzoates. In some embodiments, the heterocyclic compounds are selected from the group consisting of 2,2,6,6-tetramethylpiperidine and 2,6-diisopropylpiperidine.

In some embodiments, the silicon compounds have the formula $R^1_a R^2_b Si(OR^3)_c$, where a and b are integer numbers from 0 to 2, c is an integer from 1 to 3 and the sum (a+b+c) is 4; $R^1$, $R^2$ and $R^3$ are alkyl, cycloalkyl or aryl radicals with 1-18 carbon atoms optionally containing heteroatoms.

In some embodiments, the silicon compounds are selected from the group consisting of (tert-butyl)$_2$Si(OCH$_3$)$_2$, (cyclohexyl)(methyl)Si (OCH$_3$)$_2$, (phenyl)$_2$Si(OCH$_3$)$_2$ and (cyclopentyl)$_2$Si(OCH$_3$)$_2$.

In some embodiments, the 1,3-diethers are used as external donors. In some embodiments, the internal donor is a 1,3-diether and the external donor is omitted.

In some embodiments, the catalysts are precontacted with small quantities of olefin (prepolymerization), maintaining the catalyst in suspension in a hydrocarbon solvent, and polymerizing at temperatures from room to 60° C., thereby producing a quantity of polymer from 0.5 to 3 times the weight of the catalyst.

In some embodiments, the operation takes place in liquid monomer, producing a quantity of polymer up to 1000 times the weight of the catalyst.

In some embodiments, the present disclosure provides injection-molded articles. In some embodiments, the injection-molded articles are made from or containing the presently-disclosed polyolefin compositions.

The following examples are given to illustrate, but not limit the present disclosure.

EXAMPLES

Characterizations
Xylene-Soluble (XS) Fraction at 25° C.
Solubility in xylene: Determined as follows:
2.5 g of polymer and 250 ml of xylene were introduced into a glass flask equipped with a refrigerator and a magnetic stirrer. The temperature was raised in 30 minutes up to the boiling point of the solvent. The resulting clear solution was then kept under reflux and stirred for 30 minutes. The closed flask was then kept for 30 minutes in a bath of ice and water, then in a thermostatic water bath at 25° C. for 30 minutes. The resulting solid was filtered on quick filtering paper. 100 ml of the filtered liquid were poured in a pre-weighed aluminum container, which was heated on a heating plate under nitrogen flow, thereby removing the solvent by evaporation. The container was then kept in an oven at 80° C. under vacuum until a constant weight was obtained. The weight percentage of polymer soluble in xylene at room temperature was then calculated.

The content of the xylene-soluble fraction is expressed as a percentage of the original 2.5 grams and then, by the difference (complementary to 100%), the xylene insoluble percentage (%);
XS of components B) and C) were calculated by using the formula:

$$XS_{tot} = WaXS_A + WbXS_B + WcXS_C$$

wherein Wa, Wb and Wc were the relative amount of components A, B and C, respectively, and (A+B+C=1).
Melt Flow Rate (MFR)
Measured according to ISO 1133 at 230° C. with a load of 2.16 kg, unless otherwise specified.
Tensile Modulus
The Tensile Modulus was measured according to ISO 527-2, and ISO 1873-2 on injection-molded samples.
Tensile Strength at Yield; Tensile Strength at Break; Elongation at Break; Elongation at Yield
Tensile strength at yield; tensile strength at break; elongation at break; and elongation at yield were measured according to ISO 527-2 and ISO 1873-2 on injection-molded samples.

Intrinsic Viscosity (IV)

The sample was dissolved in tetrahydronaphthalene at 135° C. and then poured into a capillary viscometer. The viscometer tube (Ubbelohde type) was surrounded by a cylindrical glass jacket; this setup allowed for temperature control with a circulating thermostatic liquid. The downward passage of the meniscus was timed by a photoelectric device.

The passage of the meniscus in front of the upper lamp started the counter which had a quartz crystal oscillator. The counter stopped as the meniscus passed the lower lamp. The efflux time was registered and converted into a value of intrinsic viscosity through Huggins' equation (Huggins, M. L., J. Am. Chem. Soc., 1942, 64, 2716), using the flow time of the pure solvent at the same experimental conditions (same viscometer and same temperature). A single polymer solution was used to determine [η].

Comonomer ($C_2$ and $C_4$) Content

The content of comonomers was determined by infrared (IR) spectroscopy by collecting the IR spectrum of the sample vs. an air background with a Fourier transform infrared spectrometer (FTIR). The instrument data acquisition parameters were:

purge time: 30 seconds minimum
collect time: 3 minutes minimum
apodization: Happ-Genzel
resolution: 2 $cm^{-1}$.

Sample Preparation—Using a hydraulic press, a thick sheet was obtained by compression molding about 1 g of sample between two aluminum foil sheets. A small portion was cut from the resulting sheet to mold a film. The film thickness was set to have a maximum absorbance of the $CH_2$ absorption band at ~720 $cm^{-1}$ of 1.3 a.u. (% Transmittance >5%). The molding conditions were carried out at a temperature of about 180±10° C. (356° F.) and a pressure of about 10 $kg/cm^2$ (142.2 psi) for about one minute. The pressure was then released. The sample was removed from the press and cooled to room temperature. The spectrum of the pressed film sample was recorded as a function of absorbance vs. wavenumbers ($cm^{-1}$). The following measurements were used to calculate ethylene ($C_2$) and 1-butene ($C_4$) contents:

a) Area ($A_t$) of the combination absorption bands between 4482 and 3950 $cm^{-1}$, which was used for spectrometric normalization of film thickness.
b) Area ($A_{C2}$) of the absorption band due to methylenic sequences ($CH_2$ rocking vibration) in a range of 660-790 $cm^{-1}$ after a proper digital subtraction of an isotactic polypropylene (IPP) and a $C_2C_4$ references spectrum.
c) The factor of subtraction ($FCR_{C4}$) between the spectrum of the polymer sample and the $C_2C_4$ reference spectrum: The reference spectrum was obtained by performing a digital subtraction of a linear polyethylene from a $C_2C_4$ copolymer to extract the $C_4$ band (ethyl group at ~771 $cm^{-1}$).

The ratio Ace/At was calibrated by analyzing ethylene-propylene standard copolymers of compositions, as determined by NMR spectroscopy.

The assignments of the spectra, triad distribution and composition were made according to Kakugo ("Carbon-13 NMR determination of monomer sequence distribution in ethylene-propylene copolymers prepared with δ-titanium trichloride-diethylaluminum chloride," M. Kakugo, Y. Naito, K. Mizunuma and T. Miyatake, *Macromolecules*, 1982, 15, 1150).

To calculate the ethylene ($C_2$) and 1-butene ($C_4$) content, calibration curves were obtained by using reference samples of ethylene and 1-butene that were detectable by $^{13}C$ NMR.

Calibration for ethylene—A calibration curve was obtained by plotting Ace/At versus ethylene molar percent (% $C_{2m}$), and the coefficients $a_{C2}$, $b_{C2}$ and $c_{C2}$ were then calculated via linear regression.

Calibration for 1-butene—A calibration curve was obtained by plotting $FCR_{C4}/A_t$ versus butane molar percent (% $C_4m$), and the coefficients $a_{C4}$, $b_{C4}$ and $C_{C4}$ were then calculated via linear regression.

The spectra of the samples were recorded and then ($A_t$), ($A_{C2}$) and ($FCR_{C4}$) were calculated.

The ethylene content (% molar fraction Cam) of the sample was calculated as follows:

$$\% \; C2m = -b_{C2} + \frac{\sqrt{b_{C2}^2 - 4 \cdot a_{C2} \cdot \left(c_{C2} - \frac{A_{C2}}{A_t}\right)}}{2 \cdot a_{C2}}$$

The 1-butene content (% molar fraction $C_{4m}$) of the sample was calculated as follows:

$$\% \; C4m = -b_{C4} + \frac{\sqrt{b_{C4}^2 - 4 \cdot a_{C4} \cdot \left(c_{C4} - \frac{FCR_{C4}}{A_t}\right)}}{2 \cdot a_{C4}}$$

where $a_{C4}$, $b_{C4}$, $c_{C4}$, $a_{C2}$, $b_{C2}$, $c_{C2}$ were the coefficients of the two calibrations.

Changes from mol % to wt % were calculated by using molecular weights of the compound(s).

Amount (wt %) of comonomer of components A-C were calculated by using the following relationship:

$$Com_{tot} = WaCom_A + WbCom_B + WcCom_C$$

wherein Wa, Wb and We were the relative amount of components A, B and C, respectively, and (A+B+C=1).

$Com_{tot}$, $COM_A$, $COM_B$ and ComC were the amounts of comonomer in the total composition (tot) and components A-C.

Melting Point

The melting point was measured by using a DSC instrument according to ISO 11357-3, at scanning rate of 20 C/min both in cooling and heating, on a sample of weight between 5 and 7 mg., under inert N2 flow. Instrument calibration was made with Indium.

Preparation of component T2

Catalyst System and Prepolymerization:

Before introducing the solid catalyst component into the polymerization reactors, the solid catalyst component was contacted at 30° C. for 9 minutes with aluminum triethyl (TEAL) and dicyclopentyldimethoxysilane (DCPMS) at a TEAL/DCPMS weight ratio of about 15 and in such a quantity that the TEAL/solid catalyst component weight ratio was about 4.

The catalyst system was then subjected to prepolymerization by suspending the catalyst system in liquid propylene at 50° C. for about 75 minutes before introducing the catalyst system into the first polymerization reactor.

Polymerization

The polymerization was carried out in continuous mode in a series of three gas-phase reactors equipped with devices to transfer the product from the first reactor to the second reactor. A propylene-based polymer (A) was produced in the first gas phase polymerization reactor by feeding the prepolymerized catalyst system, hydrogen (the molecular weight regulator) and propylene, with the components in a gas state, in a continuous and constant flow. The propylene-based polymer (A) coming from the first reactor was discharged in a continuous flow and, after having been purged of unreacted monomers, introduced, in a continuous flow, into the second gas phase reactor, together with quantitatively constant flows of hydrogen and ethylene, with the components in a gas state. In the second reactor, a copolymer of ethylene (B) was produced. The product coming from the second reactor was discharged in a continuous flow and, after having been purged of unreacted monomers, introduced, in a continuous flow, into the third gas phase reactor, together with quantitatively constant flows of hydrogen, ethylene and propylene, with the components in a gas state. In the third reactor, an ethylene-propylene polymer (C) was produced. Polymerization conditions, molar ratio of the reactants and compositions of the resulting copolymers are shown in Table 1. The polymer particles exiting the third reactor were subjected to a steam treatment to remove the reactive monomers and volatile substances and then dried. Thereafter, the polymer particles were mixed with a stabilizing additive composition in a twin screw extruder Berstorff ZE 25 (length/diameter ratio of screws: 34) and extruded under a nitrogen atmosphere in the following conditions:

Rotation speed: 250 rpm;
Extruder output: 15 kg/hour;
Melt temperature: 245° C.

The stabilizing additive composition was made from or containing the following components:

0.1% by weight of Irganox® 1010;
0.1% by weight of Irgafos® 168; and
0.04% by weight of DHT-4A (hydrotalcite);

where the percentage amounts refer to the total weight of the polymer and stabilizing additive composition.

Irganox® 1010 was 2,2-bis[3-[,5-bis(1,1-dimethylethyl)-4-hydroxyphenyl)-1-oxopropoxy]methyl]-1,3-propanediyl-3,5-bis(1,1-dimethylethyl)-4-hydroxybenzene-propanoate, and Irgafos® 168 was tris(2,4-di-tert.-butylphenyl)phosphite. The characteristics of the polymer composition, reported in Table 2, were obtained from measurements carried out on the extruded polymer, which constituted a stabilized ethylene polymer composition.

TABLE 1

| Polymerization conditions | | |
|---|---|---|
| Example | | 1 |
| $1^{st}$ Reactor - component (A) | | |
| Temperature | ° C. | 60 |
| Pressure | barg | 16 |
| $H_2/C_3-$ | mol. | 0.24 |
| Split | wt % | 22 |
| Xylene soluble of (A) ($XS_A$) | wt % | 4.2 |
| MFR of (A) | g/10 min | 110 |
| $2^{nd}$ Reactor - component (B) | | |
| Temperature | ° C. | 80 |
| Pressure | barg | 18 |

TABLE 1-continued

| Polymerization conditions | | |
|---|---|---|
| $H_2/C_2-$ | mol. | 0.81 |
| $C_4-/(C_2- + C_4-)$ | mol. | 0.25 |
| $C_2-/(C_2- + C_3-)$ | mol. | 0.98 |
| Split | wt % | 32 |
| $C_2-$ content of B * | wt % | 90 |
| $C_4-$ content of B * | wt % | 10 |
| Xylene soluble of B ($XS_B$) * | wt % | 16.0 |
| Xylene soluble of (A + B) | wt % | 12.0 |
| MFR of (A + B) | g/10 min. | 35.9 |
| $3^{rd}$ Reactor - component (C) | | |
| Temperature | ° C. | 65 |
| Pressure | barg | 18 |
| $H_2/C_2-$ | mol. | 0.17 |
| $C_2-/(C_2- + C_3-)$ | mol. | 0.42 |
| Split | wt % | 46 |
| $C_2-$ content of C * | wt % | 52 |
| Xylene soluble of (C) ($XS_C$) * | wt % | 83 |

Notes:
$C_2-$ = ethylene (IR); $C_3-$ = propylene (IR); $C_4-$ = 1-butene (IR); split = amount of polymer produced in the concerned reactor.
* Calculated values.

The features of the polymer of Example 1 are reported in Table 2.

TABLE 2

| Example | | 1 |
|---|---|---|
| component A | | |
| $C_2$ content | wt % | 0 |
| XSA | wt % | 4.2 |
| MFR | g/10 min | 110 |
| split | wt % | 22 |
| component B | | |
| XSB* | wt % | 16 |
| $C_2$ content* | wt % | 90.0 |
| $C_4$ content* | wt % | 10.0 |
| split | wt % | 32 |
| MFR of (A + B) | g/10 min | 35.9 |
| Component C | | |
| XSC* | wt % | 83 |
| $C_2$ content* | wt % | 52 |
| split | wt % | 46 |
| total composition | | |
| MFR | g/10 min | 1.61 |
| IV on soluble in Xylene | dl/g | 2.4 |

$C_2$ = ethylene; $C_4$ = 1-butene;
*calculated

T1 Component

T1 component was recycled PP from post-consumer waste and resulted in a mixture of polypropylene and polyethylene polymers. Features of T1 are reported in Table 3.

TABLE 3

| | | T1 |
|---|---|---|
| Melt flow rate (230° C./ 2.16 kg) | g/10 min | 10.2 |
| Ethylene content | Wt % | 12.0 |
| Xylene solubles at 25° C. XS | % | 10.9 |
| Intrinsic viscosity of XS | dl/g | 1.57 |
| Melting point | ° C. | 158.9 |
| Tensile modulus | MPa | 1170 |
| Tensile stress @ yield | MPa | 26.3 |

TABLE 3-continued

|  |  | T1 |
|---|---|---|
| Elongation @ yield | % | 9.8 |
| Tensile stress @break | MPa | 17.2 |
| Elongation @break | % | 54 |

To component T1, Irganox 1010 (90 ppm); Irganox 1076 (<20 ppm); Irganox 1024 (100 ppm); and Irgafos 168 (200 ppm) were added.

T1 component was blended with 20 wt % of propylene based copolymers. The properties of the resulting compositions are reported in Table 4.

TABLE 4

| Ex |  | Comp 1 | Ex 2 | Comp 3 | Comp 4 |
|---|---|---|---|---|---|
| T1 | Wt % | 100 | 80 | 80 | 80 |
| T2: | Wt % |  | 20 |  |  |
| CA7320 | Wt % |  | 0 | 20 |  |
| CA138A | Wt % |  | 0 |  | 20 |
| Melt flow rate (230° C./2.16 kg) | g/10 min | 10.2 | 7.0 | 6.4 | 6.8 |
| Tensile stress @ yield | MPa | 26.3. | 18.5 | 18.4 | 19.4 |
| Elongation @ yield | % | 9.8 | 15.0 | 10.8 | 8.5 |
| Tensile stress @break | MPa | 17.2 | 21.6 | 14.8 | 14.7 |
| Elongation @break | % | 54 | 580 | 290 | 45 |

CA7320: Hifax CA 7320 A was a reactor TPO (thermoplastic polyolefin), commercially available from LyondellBasell.
CA138A: Hifax™ CA138A was a thermoplastic olefin (TPO) resin, commercially available from LyondellBasell.

What is claimed is:

1. A polyolefin composition comprising:
   T1) 50-90 wt %; of a recycled polyolefin mixture containing from 90 wt % to 50 wt % of propylene derived units and from 5 wt % to 40 wt % of ethylene derived units and optionally containing up to 15 wt % of olefin derived units selected from the group consisting of 1-butene, 1-hexene, and 1-octene; wherein the recycled polyolefin mixture has:
      i) a fraction soluble in xylene at 25° C. from 5 wt % to 30 wt %;
      ii) an intrinsic viscosity (measured in tetrahydronaphthalene at 135° C.) of the xylene soluble fraction at 25° C. between 0.5 to 4.0 dl/g;
      iii) a melt flow rate (230° C./2.16 kg) between 1 to 50 g/10 min; and
      iv) a melting point measured by DSC from 148° C. to 162° C.; and
   T2) 10-50 wt % of a polyolefin component containing:
      A) 5-35% by weight of a propylene homopolymer or a propylene ethylene copolymer containing 90% by weight or more of propylene units; component A) containing 10% by weight or less of a fraction soluble in xylene at 25° C. (XSA), both the amount of propylene units and the fraction XSA being referred to the weight of A);
      B) 20-50% by weight; of a copolymer of ethylene and a $C_3$-$C_8$ alpha-olefin containing from 0.1% to 20% by weight of alpha-olefin units and containing 25% by weight or less; of a fraction soluble in xylene at 25° C. ($XS_B$), both the amount of alpha-olefin units and the fraction $XS_B$ being referred to the weight of (B); and
      C) 30-60% by weight of a copolymer of ethylene and propylene containing from 25% to 75% by weight of ethylene units and containing from 40% to 95% by weight of a fraction soluble in xylene at 25° C. ($XS_C$), both the amount of ethylene units and the fraction $XS_C$ being referred to the weight of (C);
   the sum of the amounts of (A), (B) and (C) being referred to the total weight of (A), (B) and (C), being 100;
   the sum of the amount of T1) and T2), being referred to the total weight of T1) and T2), being 100.

2. The polyolefin composition according to claim 1, wherein
   Component A ranges from 10% by weight to 30% by weight;
   Component B ranges from 25% by weight to 45% by weight; and
   Component C ranges from 35% by weight to 55% by weight.

3. The polyolefin composition according to claim 1, wherein
   Component A ranges from 15% by weight to 25% by weight;
   Component B ranges from 30% by weight to 40% by weight; and
   Component C ranges from 40% by weight to 50% by weight.

4. The polyolefin composition according to claim 1, wherein component A) is a polypropylene homopolymer.

5. The polyolefin composition according to claim 1, wherein component B) is a copolymer of ethylene and a $C_3$-$C_8$ alpha-olefin containing from 5% to 15% by weight of alpha-olefin units.

6. The polyolefin composition according to claim 1, wherein component C) is a copolymer of ethylene and propylene containing from 37% to 65% by weight of ethylene units.

7. The polyolefin composition according to claim 1, wherein component (A) has a melt flow rate (230° C./2.16 kg) between 50 to 200 g/10 min.

8. The polyolefin composition according to claim 1, wherein components (A)+(B) blended together have a melt flow rate (230° C./2.16 kg) between 0.1 to 70 g/10 min.

9. The polyolefin composition according to claim 1, wherein the polyolefin composition T2) has a melt flow rate (230° C./2.16 kg) between 0.5 to 25 g/10 min.

10. The polyolefin composition according to claim 1, wherein component T1) is a mixture of recycled polypropylene and polyethylene blend.

11. The polyolefin composition according to claim 1, wherein component T1) has a tensile modulus from 500 MPa to 1800 MPa.

12. The polyolefin composition according to claim 1, wherein component T1) has an elongation at break from 20% to 200%.

13. The polyolefin composition according to claim 1, wherein component T1) has a tensile stress at break from 9 MPa to 30 MPa.

14. The polyolefin composition according to claim 1, wherein component T1) ranges from 60 to 80 wt % and component T2) ranges from 40 to 20 wt %.

* * * * *